(12) United States Patent
Lee et al.

(10) Patent No.: US 11,646,161 B2
(45) Date of Patent: *May 9, 2023

(54) CAPACITOR COMPONENT

(71) Applicant: SAMSUNG ELECTRO-MECHANICS CO., LTD., Suwon-si (KR)

(72) Inventors: Jang Yeol Lee, Suwon-si (KR); Ji Hong Jo, Suwon-si (KR); Yoo Jeong Lee, Suwon-si (KR); Myung Jun Park, Suwon-si (KR); Jong Ho Lee, Suwon-si (KR); Hye Young Choi, Suwon-si (KR); Jae Hyun Lee, Suwon-si (KR); Hyun Hee Gu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,890

(22) Filed: Dec. 16, 2021

(65) Prior Publication Data

US 2022/0108845 A1 Apr. 7, 2022

Related U.S. Application Data

(63) Continuation of application No. 15/931,851, filed on May 14, 2020, now Pat. No. 11,239,032.

(30) Foreign Application Priority Data

Jul. 8, 2019 (KR) .................. 10-2019-0082075

(51) Int. Cl.
*H01G 4/30* (2006.01)
*H01G 4/012* (2006.01)
(Continued)

(52) U.S. Cl.
CPC .................. *H01G 4/30* (2013.01); *H01G 2/02* (2013.01); *H01G 4/008* (2013.01); *H01G 4/012* (2013.01); *H01G 4/1218* (2013.01)

(58) Field of Classification Search
CPC ........ H01G 4/30; H01G 4/012; H01G 4/1227; H01G 4/2325; H01G 4/1209; H01G 4/228;
(Continued)

(56) References Cited

U.S. PATENT DOCUMENTS 10,068,710 B2  9/2018  Nishisaka et al.
11,239,032 B2 *  2/2022  Lee ................... H01G 4/008
(Continued)

FOREIGN PATENT DOCUMENTS

CN  106356190 A  1/2017
CN  107251177 A  10/2017
(Continued)

OTHER PUBLICATIONS

U.S. Notice of Allowance dated Nov. 24, 2021 issued in U.S. Appl. No. 15/931,851.

(Continued)

*Primary Examiner* — Michael P McFadden
(74) *Attorney, Agent, or Firm* — Morgan, Lewis & Bockius LLP

(57) ABSTRACT

A capacitor component includes a body including dielectric layers, first and second internal electrodes, laminated in a first direction, facing each other, and first and second cover portions, disposed on outermost portions of the first and second internal electrodes, and first and second external electrodes, respectively disposed on both external surfaces of the body in a second direction, perpendicular to the first direction, and respectively connected to the first and second internal electrodes. An indentation is disposed at at least one (Continued)

of boundaries between the first internal electrodes and the first external electrode or one of boundaries between the second internal electrodes and the second external electrode.

14 Claims, 10 Drawing Sheets

(51) Int. Cl.
*H01G 2/02* (2006.01)
*H01G 4/12* (2006.01)
*H01G 4/008* (2006.01)

(58) Field of Classification Search
CPC .......... H01G 4/306; H01G 2/02; H01G 4/008; H01G 4/1218
See application file for complete search history.

(56) References Cited

U.S. PATENT DOCUMENTS

| | | | |
|---|---|---|---|
| 2001/0019176 A1* | 9/2001 | Ahiko | H01G 4/232 257/772 |
| 2002/0046861 A1* | 4/2002 | Yokoyama | H01C 17/283 174/565 |
| 2007/0109718 A1 | 5/2007 | Horie et al. | |
| 2011/0110014 A1* | 5/2011 | Hirata | H01G 4/30 156/89.12 |
| 2012/0127626 A1 | 5/2012 | Chang et al. | |
| 2013/0049532 A1* | 2/2013 | Kim | H01C 7/18 361/321.1 |
| 2014/0204502 A1 | 7/2014 | Chun et al. | |
| 2016/0217930 A1* | 7/2016 | Yamaguchi | H01G 4/0085 |
| 2016/0268046 A1 | 9/2016 | Nishisaka et al. | |
| 2017/0018358 A1* | 1/2017 | Isota | H01G 4/30 |
| 2017/0018362 A1* | 1/2017 | Nishisaka | H01G 4/30 |
| 2021/0012964 A1 | 1/2021 | Lee et al. | |
| 2021/0012967 A1 | 1/2021 | Lee et al. | |

FOREIGN PATENT DOCUMENTS

| | | |
|---|---|---|
| CN | 112201475 A | 1/2021 |
| CN | 112201476 A | 1/2021 |
| JP | H10-135063 A | 5/1998 |
| JP | WO2005/083727 A1 | 9/2005 |
| JP | 2006-128385 A | 5/2006 |
| JP | 2006-210590 A | 8/2006 |
| KR | 10-1141417 B1 | 5/2012 |
| KR | 10-2014-0095361 A | 8/2014 |
| KR | 10-1800212 B1 | 11/2017 |
| KR | 10-2018-0067482 A | 6/2018 |

OTHER PUBLICATIONS

U.S. Non-Final Office Action dated Aug. 16, 2021 issued in U.S. Appl. No. 15/931,851.
Korean Office Action dated Sep. 10, 2020 issued in Korean Patent Application No. 10-2019-0082075 (with English translation).
Chinese Office Action dated Oct. 8, 2022 issued in Chinese Patent Application No. 202010650760.2 (with English translation).

\* cited by examiner

CAPACITOR COMPONENT

CROSS-REFERENCE TO RELATED APPLICATION(S)

This application is a continuation of U.S. patent application Ser. No. 15/931,851 filed on May 14, 2020, which claims the benefit of priority to Korean Patent Application No. 10-2019-0082075 filed on Jul. 8, 2019 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), a capacitor component, has advantages such as compactness, guaranteed high capacitance, and ease of mountability.

Recently, ceramic electronic components, in detail, multilayer capacitors, have significantly increased in capacitance. To secure capacitance, an effective margin and a thickness of a cover, an electrode terminal, or the like, should be decreased. However, such a structural change may cause a deterioration in moisture resistance reliability.

In addition, defects may occur in an electrode terminal and an internal structure of a body due to permeation of a plating solution during a plating process, which may cause a deterioration in reliability, in detail, a deterioration in characteristics and failure of a final product during high temperature/high pressure driving.

SUMMARY

An aspect of the present disclosure is to provide a capacitor component which may have improved moisture resistance reliability and may prevent permeation of a plating solution during a process and/or permeation of external moisture during driving of a product.

According to an aspect of the present disclosure, a capacitor component includes a body including dielectric layers, first and second internal electrodes, laminated in a first direction, facing each other, and first and second cover portions, disposed on outermost portions of the first and second internal electrodes, and first and second external electrodes, respectively disposed on both external surfaces of the body in a second direction, perpendicular to the first direction, and respectively connected to the first and second internal electrodes. An indentation is disposed at at least one of boundaries between the first internal electrodes and the first external electrode or one of boundaries between the second internal electrodes and the second external electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
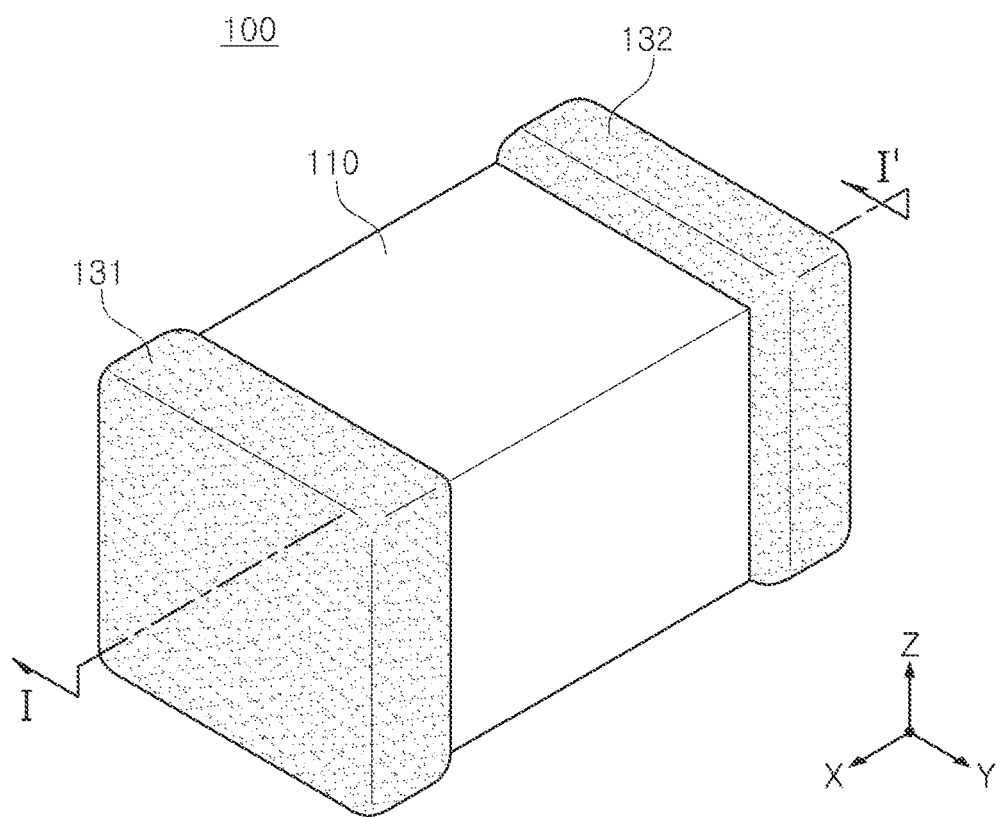
FIG. 1 is a schematic perspective view of a capacitor component according to an embodiment in the present disclosure.
Figure 2:
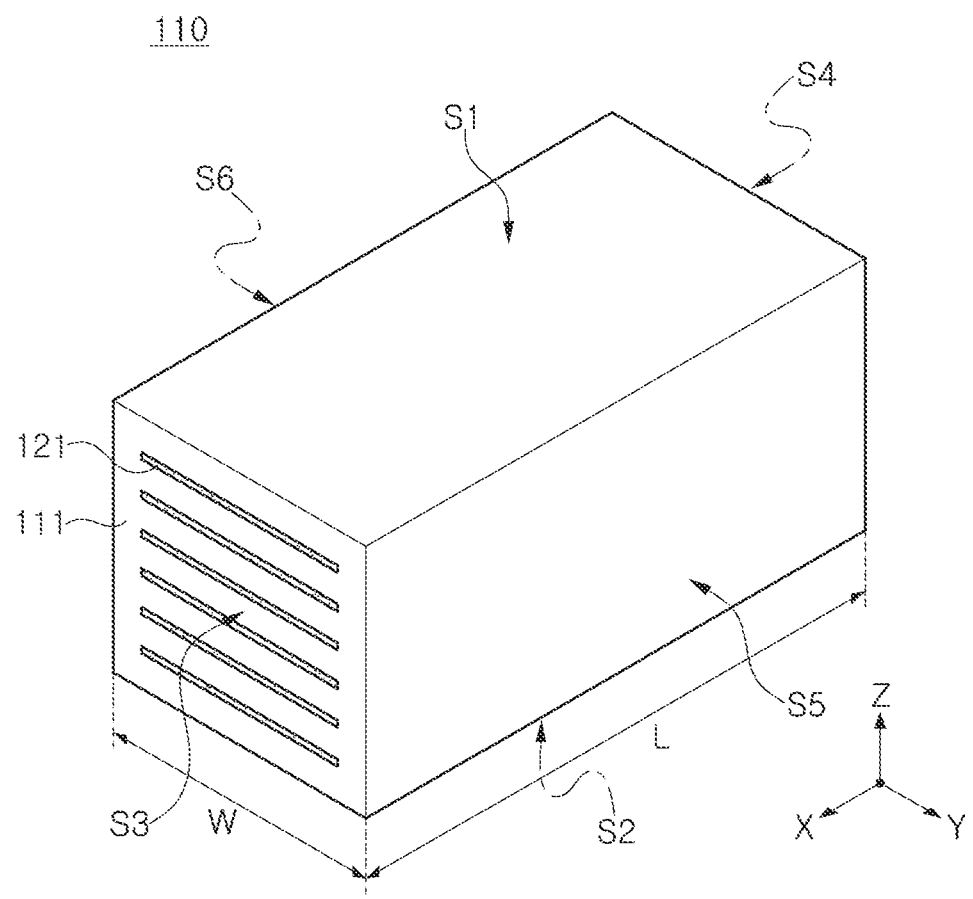
FIG. 2 is a schematic perspective view of a body of FIG. 1.
Figure 3:
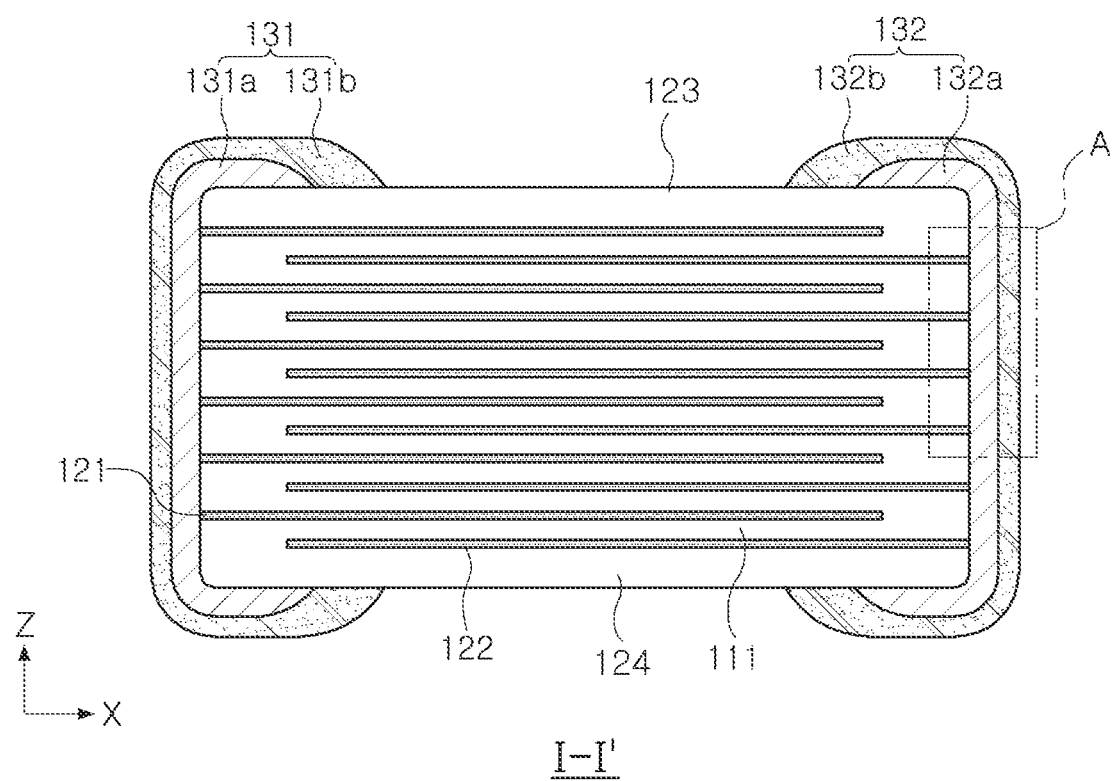
FIG. 3 is a cross-sectional view taken along line I-I' of FIG. 1.

Hereinafter, example embodiments in the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

In the drawings, a Z direction defined as a first direction, a T direction, or a thickness direction, an X direction may be defined as a first direction, an L direction, or a length direction, and a Y direction may be defined as a second direction, a W direction, or a width direction.

Hereinafter, a capacitor component according to an example embodiment in the present disclosure will be described in detail with reference to FIGS. 1 to 7.

A capacitor component 100 according to the present disclosure includes a body 110 including a dielectric layer 111, first and second internal electrodes 121 and 122, laminated in a first direction (a Z direction), opposing each other, and first and second cover portions, disposed on outermost portions of the first and second internal electrodes 121 and 122, and first and second external electrodes 131 and 132, respectively disposed on both external surfaces of the body 110 in a second direction (an X direction), perpendicular to the first direction (the Z direction), and respectively electrically connected to the first and second internal electrodes 121 and 122. Indentations, such as groove portions, may be disposed at at least one of a boundary between the first internal electrode 121 and the first external electrode 131 and a boundary between the second internal electrode 122 and the second external electrode 132, and may include a glass.

Figure 4:
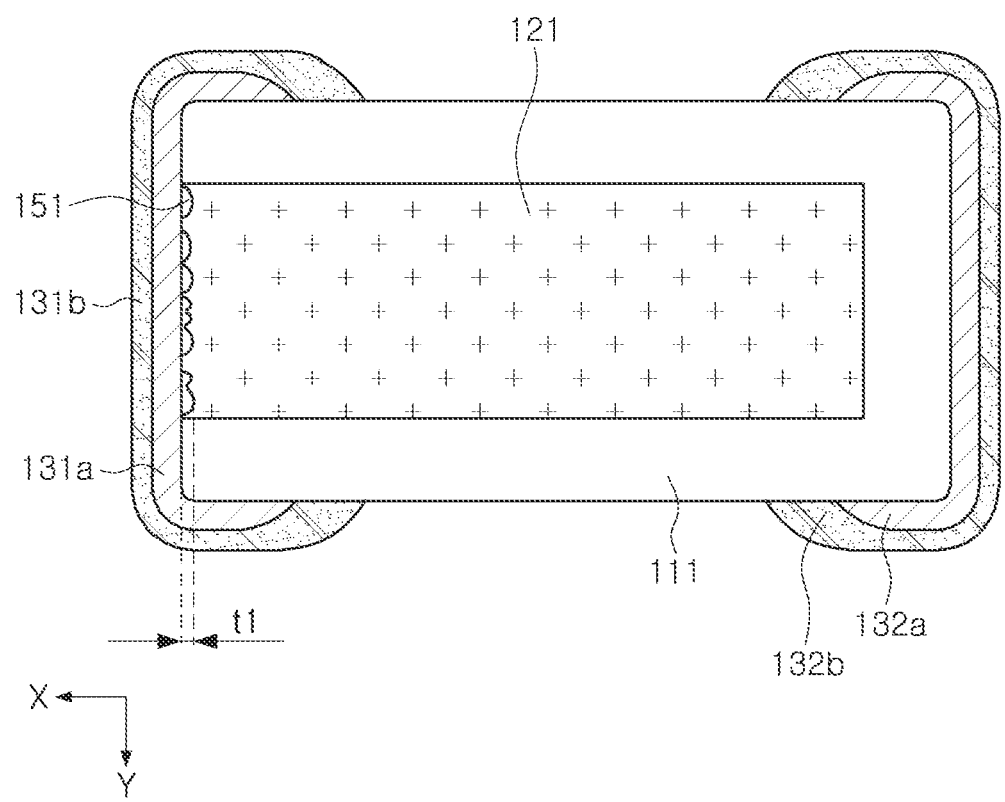
FIG. 4 is a cross-sectional view in X and Y directions of FIG. 1, and illustrates a cross section in which a first internal electrode is visible.
Figure 5:
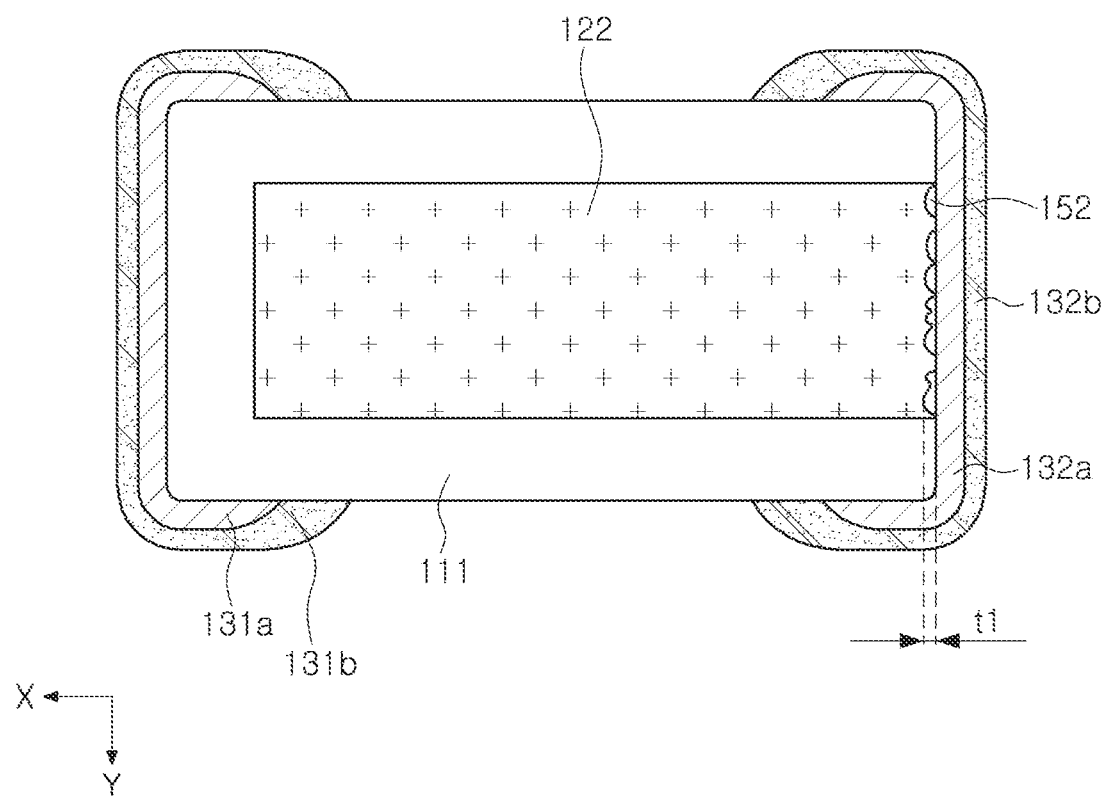
FIG. 5 is a cross-sectional view in X and Y directions of FIG. 1, and illustrates a cross section in which a second internal electrode is visible.

FIGS. 4 and 5 illustrate indentations 151 and 152. Referring to FIGS. 4 and 5, the indentation 151 is disposed at a boundary between the first internal electrode 121 and the first external electrode 132, and the indentation 152 may be disposed at a boundary between the second internal electrode 122 and the second external electrode 132. A method of forming the indentations 151 and 152 is not limited. For example, the indentations 151 and 152 may be formed by adjusting a composition and/or a content of a metal, included in an internal electrode, and using a sintering rate different from a ceramic layer during a sintering process. Alternatively, the indentations 151 and 152 may be formed by adjusting a content of a glass material, included in an external electrode, and using the glass material exuded when the external electrode is sintered. Such an indentation may serve to significantly reduce occurrence of a defect in spite of permeation of external moisture while maintaining a contact with an external electrode.

The indentation may be formed in at least one of the boundary between the first internal electrode 121 and the first external electrode 131 and the boundary between the second internal electrode 122 and the second external electrode 132.

In an example, the indentations 151 and 152 may be disposed at an outermost boundary of the body 110 in the first direction among the boundary between the first internal electrode 121 and the first external electrode 131 and the boundary between the second internal electrode 122 and the second external electrode 132. In other words, the indentations 151 and 152 may be disposed in two locations corresponding to innermost electrodes 121 and 122 farthest away from the inner electrodes 121 and 122 included in the body 110, and the indentations 151 and 152 may be disposed in the uppermost and lowermost internal electrodes 121 and 122 among the internal electrodes 121 and 122 of the body 110.

Figure 7:
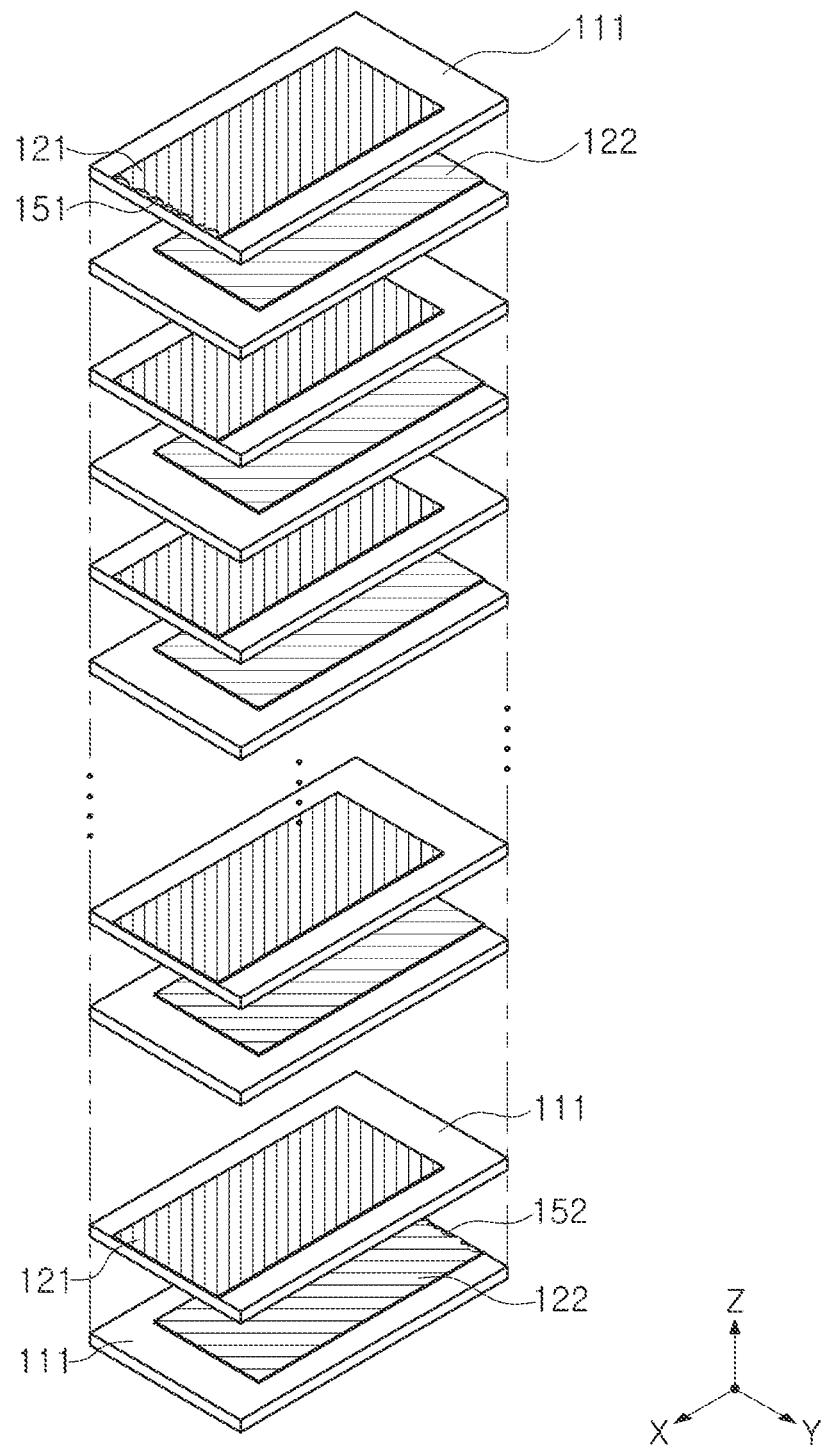
FIG. 7 is a schematic diagram of an internal electrode according to an embodiment in the present disclosure.

FIG. 7 is a schematic diagram of a dielectric layer and an internal electrode included in a body according to the present embodiment. Referring to FIG. 7, indentations 151 and 152 may be present in an outermost boundary of a body 110 in a first direction, among a boundary between a first internal electrode 121 and a first external electrode 131 and a boundary between a second internal electrode 122 and a second external electrode 132. For example, indentations 151 and 152 may be present in only outermost boundaries of a body 110 in a first direction, among boundaries between first internal electrodes 121 and a first external electrode 131 or boundaries between second internal electrodes 122 and a second external electrode 132. As described above, the indentations 151 and 152 may be disposed in the outermost boundary of the body 110 in the first direction 110, among the boundary between a first internal electrode 121 and a first external electrode 131 and the boundary between a second internal electrode 122 and a second external electrode 132, such that moisture resistance reliability of an outermost region, to which a plating solution and external moisture are most apt to permeate, may be improved.

Figure 8:
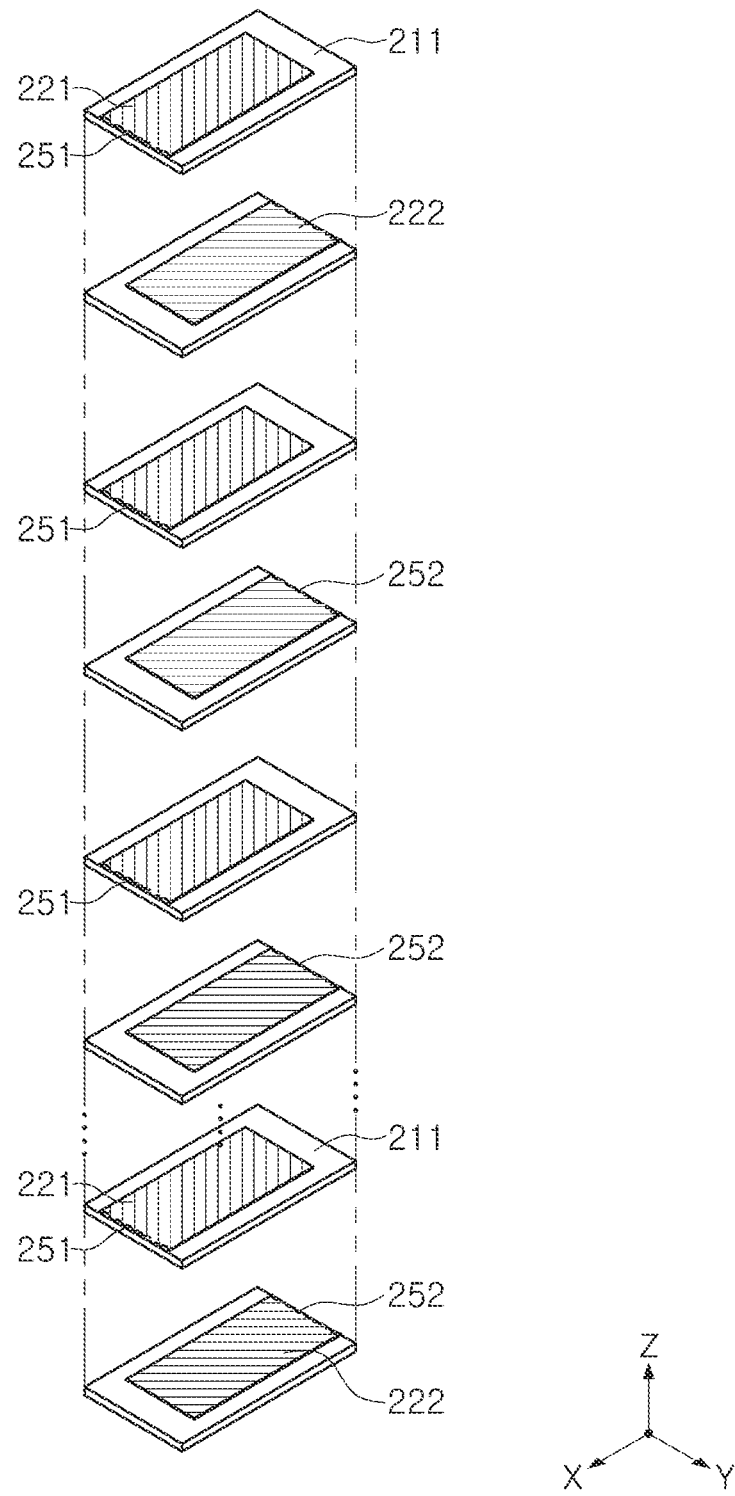
FIG. 8 is a schematic diagram of an internal electrode according to another embodiment in the present disclosure.

In another example, the indentations 251 and 252 may be disposed at a boundary between the first internal electrode 221 and the first external electrode 131 and a boundary between the second internal electrode 222 and the second external electrode 132, and may be disposed in both the boundaries. FIG. 8 is a schematic view illustrating a dielectric layer and the internal electrode included in the body according to the present embodiment. Referring to FIG. 8, indentations may be disposed in boundaries where all of the first and second internal electrodes 221 and 222 and the first and second external electrodes 131 and 132, included in a body 110, meet. In other words, an indentation may be formed on the first and second internal electrodes 221 and 222 exposed in a second direction (an X direction). In this case, reliability of moisture resistance against permeation of external moisture may be significantly improved.

In an embodiment, the sum of widths of the indentations 151 and 152 of the first internal electrode 121 or the second internal electrode 122 may range from 30% to 80% of an overall width of the first internal electrode 121 or the second internal electrode 122. The sum of the widths of the grooves of the first internal electrode 121 may refer to a length obtained by adding all widths of the grooves 151 formed in the first internal electrode 121 in a third direction (a W direction), and may refer to, for example, the sum of widths of the indentations 151 formed in a surface of the first internal electrode 121 closest to the first external electrode 131. In addition, the sum of the widths of the grooves 152 of the second internal electrodes 122 may refer to a length obtained by adding all widths of the grooves 152 formed in the second internal electrodes 122 in the third direction (the W direction), and may refer to, for example, the sum of widths of the indentations 152 formed on a surface of the second internal electrode 122 closest to the second external electrode 132. The overall width of the first internal electrode 121 or the second internal electrode 122 may refer to a length of the first internal electrode and the second internal electrode in the Y direction, and may correspond to a length obtained by adding a width of a portion, in which the first internal electrode are in contact with the first external electrode, and the sum of the widths of the indentations 151, or correspond to a length obtained by adding a width of a portion, in which the second internal electrode is in contact with the second external electrode, and the sum of the widths of the indentations 152. When the sum of the widths of the indentations 151 of the first internal electrode 121 o with respect to the overall width of the first internal electrode 121 or the sum of the widths of the indentations 152 of the second internal electrode 122 with respect to the overall width of the second internal electrode 122 satisfies the above range, occurrence of a defect, caused by permeation of external moisture, may be significantly reduced.

Figure 6:
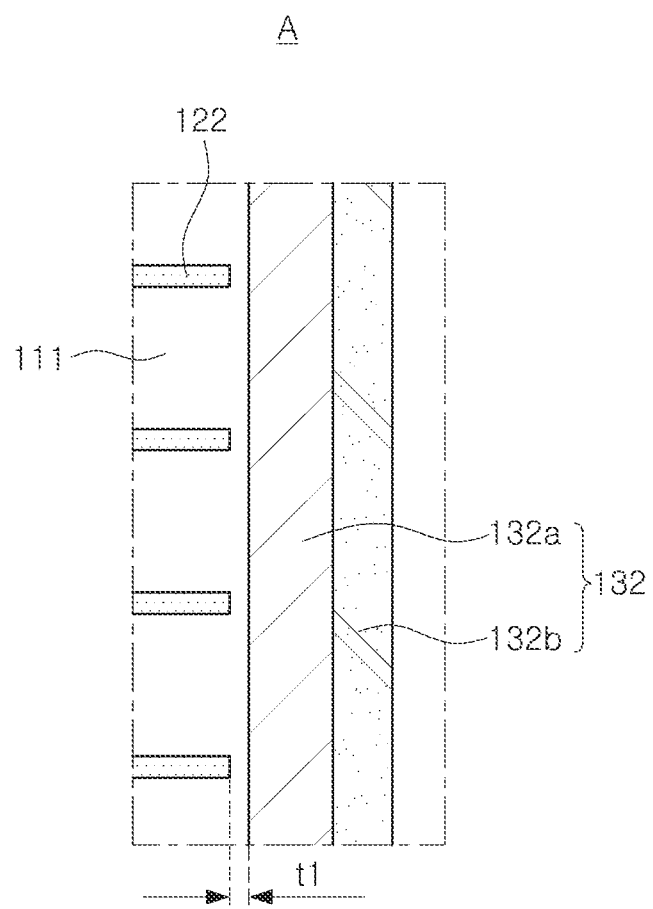
FIG. 6 is an enlarged view of portion A of FIG. 3.

In an embodiment, each of the grooves 151 and 152 may have a dimension t1 of 5 µm or less. The dimension t1 of each of the grooves 151 and 152 may refer to a dimension of each of the grooves 151 and 152 in a second direction (an X direction). FIGS. 4 and 6 are schematic diagrams illustrating a dimension t1 of an indentation according to the present embodiment. Referring to FIGS. 4 and 6, when viewed in the Y direction, the dimension t1 of the groove may refer to a length at which an internal electrode and an external electrode are not in contact with each other. When the dimension of each of the grooves 151 and 152 is greater than 5 µm, contactability between the internal electrodes 121 and 122 and the external electrodes 131 and 132 may be deteriorated. A lower limit of the dimension of each of the grooves 151 and 152 is not limited, but may be, for example, greater than 0 µm. For example, the lower limit of the dimension t1 of each of the grooves 151 and 152 may be 0.01 µm or more. When the grooves do not exist or the lower limit of the dimension of each of the grooves 151 and 152 is less than the above range, contactability failure between the internal electrodes 121 and 122 and the external electrodes 131 and 132 may occur and the moisture resistance reliability may be deteriorated.

In an embodiment, the body 110 may include a dielectric layer 111, first and second internal electrodes 121 and 122, and first and second cover portions.

A detailed shape of the body 110 is not limited to any specific shape. However, as illustrated, the body 110 may have a hexahedral shape or a shape similar thereto. Due to shrinkage of ceramic powder particles included the body 110 during a sintering process, the body 110 may have a substantially hexahedral shape rather than an exact hexahedron having completely straight lines. The body 110 may have first and second surfaces S1 and S2 opposing each other in a thickness direction (a Z direction), third and fourth surfaces S3 and S4, connected to the first and second surfaces S1 and S2, opposing each other in a length direction (an X direction), and fifth and sixth surfaces S5 and S6, connected to the first and second surfaces S1 and S2 as well as to the third and fourth surfaces S3 and S4, opposing each other in a width direction (a Y direction).

The body 110 may be formed by alternately laminating a ceramic green sheet, on which the first internal electrode 121 is printed, and a ceramic green sheet, on which the second internal electrode 122 is printed, on the dielectric layer 111 in the thickness direction (the Z direction).

In an example, the dielectric layers 111 and the internal electrodes 121 and 122 may be alternately laminated in the first direction. A plurality of dielectric layers 111 may be in a sintered state, and adjacent dielectric layers 111 may be integrated with each other such that boundaries therebetween are not readily apparent without using a scanning electron microscope (SEM).

According to an embodiment, a material of the dielectric layer 111 is not limited to any particular material as long as sufficient capacitance can be obtained therefrom. For example, the material of the dielectric layer 111 may be a barium titanate-based material, a lead composite perovskite-based material, a strontium titanate-based material, or the like.

In addition, various ceramic additives, organic solvents, plasticizers, binders, dispersants, and the like, may be added to the powder particles such as barium titanate ($BaTiO_3$), or the like, depending on the object of the present disclosure.

For example, the dielectric layer 111 may be formed by applying and drying slurries, formed to include powder particles such as barium titanate ($BaTiO_3$), on a carrier film to prepare a plurality of ceramic sheets. The ceramic sheet may be formed by mixing ceramic powder particles, a binder, and a solvent to prepare slurries and forming the slurries into a sheet type having a thickness of several micrometers ($\mu m$) by a doctor blade method, but a method of forming the ceramic sheet is not limited thereto.

In an example, an average thickness of the dielectric layer 111 may be 0.4 $\mu m$ or less. The average thickness of the dielectric layer 111 may be an average of values measured in five different points of the sintered dielectric layer 111. A lower limit of the average thickness of the dielectric layer 111 is not limited, but may be, for example, 0.01 $\mu m$ or more.

In an example, a plurality of internal electrodes 121 and 122 may be disposed to oppose each other with the dielectric layer 111 interposed therebetween. The internal electrodes 121 and 122 may include a first internal electrode 121 and a second internal electrode 122, which are alternately disposed to oppose each other with the dielectric layer 111 therebetween.

The first internal electrode 121 may be exposed to one surface of the body 110 in the second direction (the X direction) and a portion, exposed to one surface of the body 110 in the second direction (the X direction), may be connected to the first external electrode 131. The second internal electrode 122 may be exposed to the other surface of the body 110 in the second direction (the X direction) and a portion, exposed to the other surface of the body 110 in the second direction (the X direction), may be connected to the external electrode 132. The first and second internal electrodes 121 and 122 may be electrically separated from each other by the dielectric layer 111 disposed therebetween.

A material of the first and second internal electrodes 121 and 122 is not limited, and the first and second internal electrodes 121 and 122 may be formed using a conductive paste including at least one, for example, silver (Ag), palladium (Pd), gold (Au), platinum (Pt), nickel (Ni), copper (Cu), tin (Sn), tungsten (W), palladium (Pd), titanium (Ti), or alloys thereof. As the printing method of the conductive paste may be a screen-printing method, a gravure printing method, or the like, but is not limited thereto.

An average thickness of the first and second internal electrodes 121 and 122 may be 0.4 $\mu m$ or less. The average thickness of the internal electrode may be an average of values measured in five different locations of a sintered internal electrode. A lower limit of the average thickness of the first and second internal electrodes 121 and 122 is not limited, but may be, for example, 0.01 $\mu m$ or more.

In an embodiment, first and second cover portions 123 and 124 may be disposed on the outermost sides of the first and second internal electrodes 121 and 122. The first and second cover portions 123 and 124 may be disposed below a lowermost internal electrode of the body 110 and above an uppermost internal electrode of the body 110, respectively. In this case, the lower and upper cover portions 123 and 124 may be formed of the same composition as the dielectric layer 111, and may be formed by respectively laminating one or more dielectric layers, each including no internal electrode, on the uppermost internal electrode and the lowermost internal electrode of the body 110, respectively.

Basically, the first and second cover portions may serve to prevent an internal electrode from being damaged by physical or chemical stress.

A thickness of each of the first and second cover portions is not limited, but may be, for example, 25 $\mu m$ or less. Capacitance per unit volume of the capacitor component 100 may be improved by significantly decreasing the thickness of each of the first and second cover portions.

In addition, a lower limit of the thickness of each of the first and second cover portions is not limited and may be appropriately selected in consideration of a radius of curvature R1 of body edges on end surfaces in first and second directions, for example, 5 $\mu m$ or more.

The thickness of each of the first and second cover portion may refer to a dimension in the first direction (the Z direction) of the first and second cover portions.

In an example, the first external electrode 131 and the second external electrode 132 may be disposed on both external surfaces of the body 110 in the second direction, respectively. The first external electrode 131 may be electrically connected to the first internal electrode 121, and the second external electrode 132 may be electrically connected to the second internal electrode 122.

The first and second external electrodes 131 and 132 may be disposed to extend to both external surfaces of the body 110 in the first direction (the Z direction) and to extend in the third direction (the Y direction). In this case, the first and second external electrodes 131 and 132 may extend to portions of the first and second surfaces 1 and 2 of the body 110. The first and second external electrodes 131 and 132 may also extend to portions of the fifth and sixth surfaces 5 and 6 of the body 110.

A first electrode layer 131a as an inner layer of the first external electrode 131 and a second electrode layer 132a as an inner layer of the second external electrode 132 may include copper (Cu) in highest content, but a material of the first and second electrode layers 131a and 132a is not limited thereto. For example, the first and second electrode layers 131a and 132a may be formed using a conductive paste including a glass and at least one of silver (Ag), palladium (Pd), and gold (Au), platinum (Pt), nickel (Ni), tin (Sn), tungsten (W), palladium (Pd), titanium (Ti), and alloys thereof. The conductive paste may be printed by a screen-printing method, a gravure printing method, or the like, but a printing method of the conductive paste is not limited thereto. Since the first and second electrode layers are formed using the above-mentioned conductive paste, density of an electrode layer may be increased by the added glass to effectively suppress permeation of a plating solution and/or external moisture while maintaining sufficient conductivity.

A glass material, included in the first and second electrode layers 131a and 132a, may have a composition in which oxides are mixed, but is not limited and may be at least one selected from the group consisting of silicon oxide, boron oxide, aluminum oxide, transition metal oxide, alkali metal oxide, and alkaline earth metal oxide. The transition metal may be selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na) and potassium (K), and the alkaline earth metal may be at least one selected from the group consisting of magnesium (Mg), calcium (Ca), strontium (Sr), and barium (Ba).

In an example, a central portion of each of the first and second electrode layers 131a and 132a may have a thickness ranging from 1 μm to 10 μm. The thickness of the central portion of each of the first and second electrode layers 131a and 132a may be a value measured in an intersection of lines, connecting corners facing each other, based on the four corners of a surface on which the external electrode is formed. When the first and second electrode layers 131a and 132a have a thickness lower than the above range, a body of the corner portion may be exposed. When the first and second electrode layers 131a and 132a have a thickness higher than the above range, cracking may occur during a sintering process.

In an embodiment, a plating layer 131b of the first external electrode 131 and a plating layer 132b of the second external electrode 132 may be disposed on the first and second electrode layers 131a and 132a, respectively. The plating layers 131b and 132b may be formed by sputtering or electric deposition, but a method of forming the plating layers 131b and 132b is not limited thereto.

The plating layers 131b and 132b may include nickel (Ni) in highest content, but a material of the plating layers 131b and 132b is not limited thereto. The plating layers 131b and 132b may include copper (Cu), palladium (Pd), platinum (Pt), gold (Au), silver (Ag), lead (Pb), or alloys thereof. The plating layers 131b and 132b may be provided to improve mountability with a substrate, structural reliability, external durability against the outside, thermal resistance, and/or equivalent series resistance (ESR).

In an example, the thickness of the central portion of each of the plating layers 131b and 132b may range from 3 μm to 5 μm. The thickness of the central portion of each of the plating layers 131b and 132b may be a value measured in an intersection of lines, connecting corners facing each other, based on four corners of a surface on which the plating layers 131b and 132b are formed. When each of the plating layers 131b and 132b has a thickness lower than the above range, permeation of external moisture may not be effectively blocked. When each of the plating layers 131b and 132b may have a thickness higher than the above range, the plating layers 131b and 132b may be separated due to external heat when the substrate is mounted.

Figure 9:
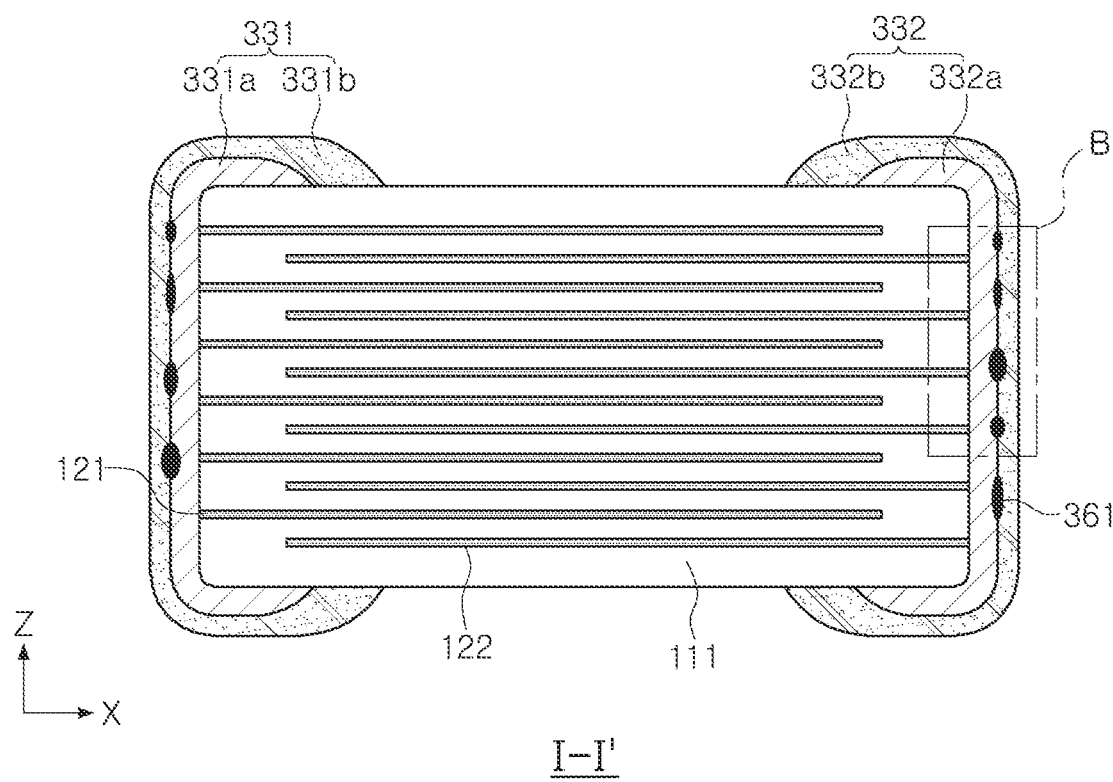
FIG. 9 is a cross-sectional view of a capacitor component according to an embodiment in the present disclosure.
Figure 10:
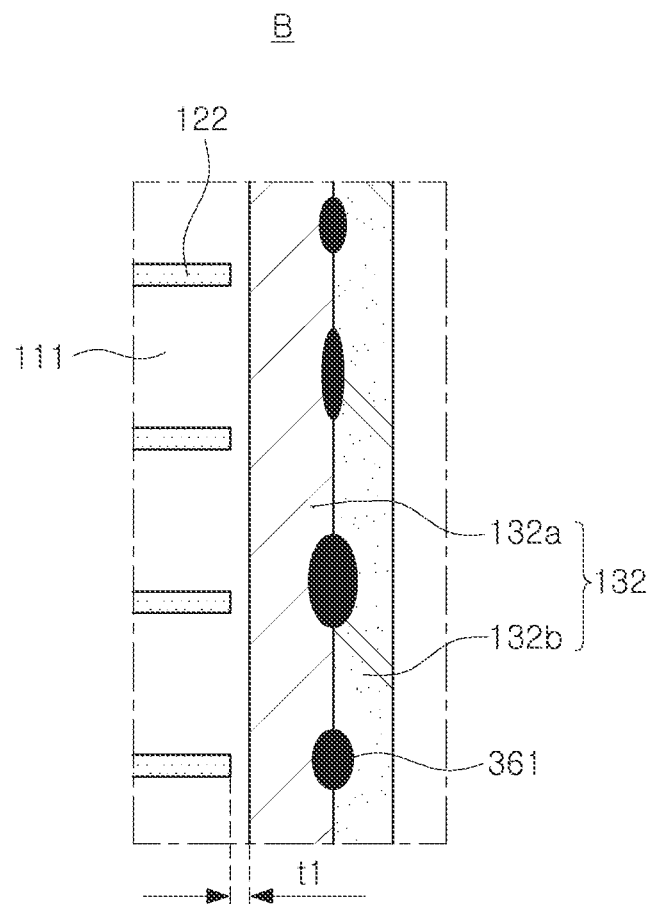
FIG. 10 is an enlarged view of portion B of FIG. 9.

FIG. 9 is a cross-sectional view of a capacitor component according to an embodiment in the present disclosure and FIG. 10 is an enlarged view of portion B of FIG. 9.

In an embodiment shown in FIGS. 9 and 10, a metal oxide 361 may be disposed on a boundary between the first electrode layer 331a and the plating layer 231b and a boundary between the second electrode layer 332a and the plating layer 332b. The metal oxide 361 may include aluminum (Al) oxide in highest content, but a material of the metal oxide 361 is not limited thereto. The metal oxide 361 may include at least one selected from the group consisting of magnesium (Mg), manganese (Mn), nickel (Ni), lithium (Li), silicon (Si), and titanium (Ti), barium (Ba), and alloys thereof.

The metal oxide 361 may be in the form of at least one of, for example, one or more islands formed on a surface of the corresponding electrode layer, a plurality of metal oxide bumps, an amorphous metal oxide, and a meal oxide powder, and may have a shape in which the above forms are mixed.

The metal oxide 361 may be generated during a polishing process using a metal oxide polishing agent to remove the glass protruding on a surface of the electrode layer to enhance the plating connectivity, or may be generated through wet chemical growth (for example, formation of a metal oxide and a glass-based secondary phase), partial dry physical/chemical growth (PVD/CVD, or the like), or the like, on a portion of the electrode layer before plating.

The metal oxide 361 may be disposed on boundaries between the electrode layers 361a and 362a and the plating layers 361b and 362b to prevent a chip internal defect, caused by permeation of the plating solution, and to prevent moisture from permeating due to a defect in a boundary between an electrode layer and a plating layer, which may contribute to improvement in moisture resistance reliability of a capacitor component.

The metal oxide 361, disposed in the boundary between the electrode layer and the plating layer, may have a dimension ranging from 5% to 90% with respect to an overall dimension of the boundary between the electrode layer and the plating layer. The dimension of the metal oxide 361 may be based on any one end surface of the capacitor component and may be, for example, a value measured based on an end surface perpendicular to the internal electrode or a surface parallel to the internal electrode. For example, in the end surface perpendicular to the internal electrode with respect to the capacitor component (for example, the surface passing through the center of the capacitor component), the dimension of the metal oxide may be based on the overall dimension of the boundary between the external electrode and the plating layer and may be a ratio of the dimension of the metal oxide exposed to the end surface. The ratio may be an average of values measured in five different points of the capacitor component.

The ratio may be adjusted within a range in which there is no interference with the plating growth, for example, 90% or less, 80% or less, 70% or less, 60% or less, 50% or less, 45% or less, 40% or less, 38% or less, 37% or less, 36% or less, or 35% or less, but is not limited thereto. In addition, a lower limit of the ratio may be, for example, 1% or more, 2% or more, 3% or more, 4% or more, 5% or more, 6% or more, 7% or more, or 7.5% or more, but is not limited thereto. When the ratio of a dimension, at which the metal oxide is present, satisfies the above range, discontinuity of the plating layer may not occur while improving the moisture resistance reliability.

Table 1 illustrates contactability, high temperature/high pressure reliability, and moisture resistance reliability depending on a dimension of an indentation. Table 1 targeted a capacitor component in an indentation was formed in each internal electrodes, and targeted a capacitor component in which the sum of widths of indentations ranged from 30 to 80% of a width of the internal electrode. In Table 1, a case, in which contactability was out of ±30% with respect to upper and lower limits of reference capacitance dose, was evaluated as failure. In terms of high temperature/high pressure reliability failure, when a voltage of 2Vr was applied at 150 degrees Celsius, the number of capacitor components, in which a failure occurred, among 400 samples, was examined. In terms of moisture resistance reliability failure, when a voltage of 1 Vr was applied at 85 degrees Celsius and 85% RH, and the number of capacitor components in which failure occurred, among 400 samples, was examined.

TABLE 1

| DIMENSION OF INDENTATION (t1) | CONTACTABILITY FAILURE | HIGH TEMPERATURE/ HIGH PRESSURE AND MOISTURE RESISTANCE RELIABILITY FAILURE |
| --- | --- | --- |
| 0 μm | 20/400 | 12/400, 15/400 |
| 5 μm | 18/400 | 0/400, 0/400 |
| 10 μm | 251/400 | NOT EVALUATED |

From Table 1, it can be seen that high temperature/high pressure reliability and moisture resistance reliability were further significantly deteriorated when an indentation has a dimension of 0 μm than when the indentation has a dimension of 5 μm, and contactability failure was significantly increased when the indentation has a dimension of 10 μm.

Table 2 illustrates plating connectivity and a chipping rate to a presence ratio of a metal oxide between an external electrode and a plating layer. A capacitor component of Table 2 was manufactured by physically etching an external electrode glass using an $Al_2O_3$ polishing agent and performing a subsequent process after adjusting a removal ratio of the polishing agent (Manner 1).

In Table 2, a ratio of a metal oxide was obtained by calculating a ratio of a dimension, occupied by $Al_2O_3$, to an overall dimension of a boundary between the external electrode and the plating layer in an end surface of a complete chip after a subsequent process. A frequency of discontinuity of the plating layer was confirmed by randomly selecting 10 manufactured capacitor components, equally dividing each of the capacitor components to a middle portion of a body into five sections in length and thickness directions to both end surfaces of each of the capacitor components in a second direction, and confirming a frequency of discontinuity of a plating layer in respective locations. The other parameters of the samples in Table 2 were the same, without considering processing errors/margins. The chipping rate was confirmed by randomly selecting 400 manufactured capacitor components and observing an exterior of a body portion using a microscope to confirm a frequency.

TABLE 2

| RATIO OF METAL OXIDE | FREQUENCY OF DISCONTINUITY OF PLATING LAYER | FREQUENCY OF CHIPPING |
| --- | --- | --- |
| 0% | 2/100 | 8/100 |
| 5% | 0/100 | 4/100 |
| 10% | 0/100 | 0/100 |
| 35% | 0/100 | 0/100 |
| 95% | 0/100 | 0/100 |

From Table 2, it can be seen that a frequency of discontinuity of a plating layer and a frequency of chipping are decreased when a metal oxide is present, and the discontinuity of the plating layer and the chipping are reduced when more than 5% of the metal oxide is present.

Table 3 illustrates plating connectivity and a chipping rate to a presence ratio of a metal oxide between an electrode layer and a plating layer. A capacitor component of Table 3 was prepared by completely coating an amorphous metal oxide on the electrode layer using a physical deposition manner and removing a metal oxide deposited at a predetermined rate using an $Al_2O_3$ polishing agent (Manner 2).

TABLE 3

| RATIO OF METAL OXIDE | FREQUENCY OF DISCONTINUITY OF PLATING LAYER | FREQUENCY OF CHIPPING |
| --- | --- | --- |
| 1% | 0/100 | 100/100 |
| 5% | 0/100 | 9/100 |
| 10% | 0/100 | 0/100 |
| 35% | 1/100 | 0/100 |
| 95% | 100/100 | 0/100 |

From Table 3, it can be confirmed that even if a metal oxide is formed in a manner different from the Manner 1 of Table 2, chipping occurs in all chips when 1% of a metal oxide is present, discontinuity and chipping of a plating layer are reduced when 5% of a metal oxide is present, and continuity occurs in all plating layers when 95% of a metal oxide is present.

Table 4 illustrates high temperature/high pressure reliability and moisture resistance reliability depending on the above manners 1 and 2. The other parameters of the samples in Table 4 were the same, without considering processing errors/margins. In terms of the high temperature/high pressure reliability failure, when a voltage of 2Vr was applied at 150 degrees Celsius, the number of capacitor components, in which failure occurred, among 400 samples, was examined. In terms of the moisture resistance reliability, when a voltage of 1 Vr was applied at 85 degrees Celsius and 85% RH, and the number of capacitor components, in which failure occurred, among 400 samples, was examined.

TABLE 4

| CLASSIFICATION | HIGH TEMPERATURE/ HIGH PRESSURE RELIABILITY FAILURE | MOISTURE RESISTANCE RELIABILITY FAILURE |
| --- | --- | --- |
| NOT APPLY MANNERS 1 AND 2 | 5/400 | 8/400 |
| APPLY MANNER 1 | 0/400 | 0/400 |
| APPLY MANNER 2 | 0/400 | 0/400 |

From Table 4, it can be seen that Manner 1 (a glass of an external electrode portion of a manufactured capacitor component is physically etched and a ratio of a polishing agent is adjusted) and Manner 2 (an amorphous metal oxide is deposited on an external electrode of a capacitor component and the deposited metal oxide is removed at a constant rate) exhibit improved high temperature/high pressure reliability and improved moisture resistance reliability even if a ratio of a metal oxide is adjusted in different manners. As a result, it is confirmed that high temperature/high pressure reliability and moisture resistance reliability of a capacitor component according to the present disclosure are not changed depending on a manufacturing method, but are improved depending on a presence ratio of a metal oxide.

As described above, according to an embodiment, an indentation may be disposed at a boundary between an internal electrode and an external electrode to significantly reduce a defect, caused by permeation of external moisture, while securing contactability with the external electrode.

According to another embodiment, an indentation may be disposed between an internal electrode and an external electrode at a predetermined size and a predetermined ratio to prevent reliability of an electronic component from being deteriorated by permeation of a plating solution or moisture.

According to another embodiment, a meal oxide may be disposed on a boundary between an electrode layer and a plating layer to prevent cracking caused by an external impact or the like.

According to another embodiment, a metal oxide layer may be disposed between an electrode layer and a plating flayer to improve moisture resistance reliability.

While example embodiments have been shown and described above, it will be apparent to those skilled in the art that modifications and variations could be made without departing from the scope of the present disclosure as defined by the appended claims.

What is claimed is:

1. A capacitor component comprising:
   a body including dielectric layers, first and second internal electrodes, laminated in a first direction, facing each other, and first and second cover portions, disposed on outermost portions of the first and second internal electrodes; and
   first and second external electrodes, respectively disposed on both external surfaces of the body in a second direction, perpendicular to the first direction, and respectively connected to the first and second internal electrodes,
   wherein plural indentations are disposed at at least one of boundaries between at least one of the first internal electrodes and the first external electrode or one of boundaries between at least one of the second internal electrodes and the second external electrode,
   wherein at least one of the first or second internal electrodes has an average thickness of 0.4 μm or less,
   wherein each of the first and second external electrodes comprises:
   an electrode layer disposed on the body and a plating layer disposed on the electrode layer,
   wherein the electrode layer includes a glass material.

2. The capacitor component of claim 1, wherein the plural indentations are disposed at outermost boundaries of the body in the first direction, among the boundaries between the first internal electrodes and the first external electrode and the boundaries between the second internal electrodes and the second external electrode.

3. The capacitor component of claim 1, wherein the plural indentation are disposed at boundaries between the first internal electrodes and the first external electrode and boundaries between the second internal electrodes and the second external electrode.

4. The capacitor component of claim 1, wherein a sum of widths of the plural indentations in one of the first and second internal electrodes ranges from 30% to 80% of an overall width of the one of the first and second internal electrode.

5. The capacitor component of claim 1, wherein at least one of the plural indentations has a dimension of 5 μm or less.

6. The capacitor component of claim 1, wherein at least one of the dielectric layers has an average thickness of 0.4 μm or less.

7. The capacitor component of claim 1, wherein each of the first and second cover portions has a thickness of 25 μm or less.

8. The capacitor component of claim 1, wherein a metal oxide is disposed on a boundary between the external electrode layer and the plating layer.

9. The capacitor component of claim 8, wherein the metal oxide has one of an island, a plurality of metal oxide bumps, an amorphous metal oxide, or a metal oxide powder.

10. The capacitor component of claim 1, wherein a central portion of the electrode layer has a thickness ranging from 1 μm to 10 μm.

11. The capacitor component of claim 1, wherein a central portion of the plating layer has a thickness ranging from 3 μm to 5 μm.

12. The capacitor component of claim 1, wherein the plating layer includes nickel.

13. The capacitor component of claim 1, wherein at least one of the plural indentations includes a groove.

14. A capacitor component comprising:
   a body including dielectric layers, first and second internal electrodes, laminated in a first direction, facing each other, and first and second cover portions, disposed on outermost portions of the first and second internal electrodes; and
   first and second external electrodes, respectively disposed on both external surfaces of the body in a second direction, perpendicular to the first direction, and respectively connected to the first and second internal electrodes,
   wherein plural groove portions are disposed at at least one of boundaries between at least one of the first internal electrodes and the first external electrode or one of boundaries between at least one of the second internal electrodes and the second external electrode,
   wherein each of the first and second internal electrodes has an average thickness of 0.4 μm or less,
   wherein each of the first and second external electrodes comprises:
   an electrode layer disposed on the body and a plating layer disposed on the electrode layer,
   wherein at least one of the plural groove portions includes a groove.

* * * * *